United States Patent

[11] 3,589,672

[72] Inventor Charles J. Hoolloman
 Stamford, Conn.
[21] Appl. No. 834,568
[22] Filed Feb. 18, 1969
 Division of Ser. No. 600,900, Dec. 12, 1966,
 Pat. No. 3,482,344.
[45] Patented June 29, 1971
[73] Assignee Trans-lux Corporation
 New York, N.Y.

[54] SOLENOID CONTROLLED VALVE AND
 ARMATURE WITH ADJUSTABLE BIAS
 3 Claims, 9 Drawing Figs.
[52] U.S. Cl. .................................................. 251/129,
 251/137
[51] Int. Cl. ............................................... F16k 31/06
[50] Field of Search ........................................... 251/129,
 299, 137

[56] References Cited
 UNITED STATES PATENTS
 363,463 5/1887 Hollerith .................... 251/129 X
 1,282,275 10/1918 Morris ......................... 251/129 X
 1,286,059 11/1918 Morris ......................... 251/129 X
 2,247,838 7/1941 Grant ......................... 251/129 X
 2,335,311 11/1943 Reisner ....................... 251/129 X
 2,433,205 12/1947 Decker ....................... 251/129 X
 2,844,157 7/1958 Griffith ...................... 251/129 X Primary Examiner—Arnold Rosenthal
Attorney—Kane, Dalsimer, Kane, Sullivan and Kurucz ABSTRACT: The invention comprises a plurality of interconnected panel elements each having a plurality of generally flat bistable display members arranged thereon in a series of rows and columns. Each display member has one surface which is substantially nonreflecting and generally light absorbing. The opposite surface of each display member is bright or, in many instances, is coated with a fluorescent or a luminescent material particularly adapted for excitation by ultraviolet light to bring it to a highly luminous state for display purposes. A plurality of magnetically operated signal-controlled fluid jets is positioned adjacent to the panel and so located as to be capable of moving selected ones of the bistable display members between the two bistable positions for display. The display members are preferably arranged so that for clearance a complete column of display members can be simultaneously changed to one of the two different positions of stability which may be regarded as a datum state. Following each control of the display column with all display members similarly oriented the next adjacent column may be similarly controlled, and so on. After all display members of the display panel are in like position selective ones of the group may be oriented to the second position so that by relative contrast a message may be displayed. The panels with the messages formed thereon in such fashion are then successively moved through a display region for viewing.

INVENTOR
CHARLES J. HOLLOMAN

INVENTOR
CHARLES J. HOLLMAN
BY
Kane, Dalsimer, Kane, Sullivan & Smith
ATTORNEYS

SOLENOID CONTROLLED VALVE AND ARMATURE WITH ADJUSTABLE BIAS

This is a division of application Ser. No. 600,900, filed Dec. 12, 1966, now U.S. Pat. No. 3,482,344.

This invention relates to display panel structures for displaying intelligence, such as groups of letters, figures, characters or other pictorial forms, or combinations of any of the foregoing.

BACKGROUND OF INVENTION

In many instances in the past, efforts have been made to provide display panels, particularly for displaying changing new items, stock quotations and prices or other pictorial information, where the display is capable of being progressively changed. It has been the practice to have the initially produced message moved through a viewing area within a prescribed viewing time period while new messages are continually brought within the field of view and other messages (or parts of messages) are disappearing. Various proposals for such controls have been made. Included among previous suggestions are flashing lights arranged to move in a selected path. In other operations, display discs have also been used with the discs being arranged in generally panel formation and supported to be turned from one to another of selected display positions either by a mechanical control or by a direct mechanical engagement between a part of each disc and a suitable signal-controlled disc-turning component. Devices of the foregoing types have filled some commercial needs but, usually, are not generally satisfactory. They often are slow in their operation, at times not completely accurate and they frequently require more control parts and operate at lesser speeds than are practically adaptable to certain types of message display.

In the presentation and display of stock quotations, in accordance with the transactions carried on at leading exchanges, it has been customary to provide high-speed operating transmission of information concerning trades so that the quotations at which stocks are sold and bought can be brought promptly to the attention of the public. Mechanically controlled devices usually are incapable of operating at the rate required to adapt themselves to such high-speed transmission. Therefore, recourse has been had generally to a high-speed device for printing directly upon a tape from which the message is projected for viewing. While such forms of display units operate at relatively high speeds to portray the information, they nevertheless usually function at a slower rate than most systems are capable of transmitting the signalling controls to operate the units. Further, the system herein disclosed makes it unnecessary to transfer messages. It thus avoids the need of maintaining stocks of tape and of unreeling tape from a supply roll. The system provides an end result like most mechanical schemes and, in addition, provides a message that is always sharp and normally large enough to make subsequent projection unnecessary Also, frequent inking of the printing rolls becomes unnecessary since the message always appears in a preselected form. The end result is that this invention provides a generally foolproof high-speed system with resulting operational efficiency.

DESCRIPTION OF THE INVENTION

By the invention, a plurality of panels each having a selected number of bistable display members, usually in the form of discs (by which term they are frequently identified herein) arranged in rows and columns, are provided. Each bistable display member preferably has one side formed from a substantially dark or black nonreflecting material or covered with a coating of such character. The opposite side is generally bright and usually a coating of a suitable paint, luminescent or fluorescent material or other substances which, when exposed to viewing by lookers, will appear very bright relative to the dark face of the member and will provide the desired result. The essential factor is that there shall be a substantial contrast between the two surfaces of each display member so that, if the display is to have the information appear as a bright outline against a dark field, the control signals, illustratively, will selectively turn the bistable members so that the bright or luminescent side shall be exposed for viewing. If, on the other hand, it is desired to have a dark message on a bright field, then the opposite conditions will occur.

The panels are adapted to be maintained adjacent to each other and held in interconnected fashion on an endless belt or conveyor which, when driven, moves the separate panels within the field of view of observers. Following production, and for observation, the stored messages are retained on the panels during the period of viewing. The panels are then sequentially removed from the field of view, following which the panel discs are moved so that all occupy a like relative position.

In the first instance certain of the panel discs are turned under signal control conditions to contrasting positions to portray the intelligence. When so turned, the panels and discs are carried through the viewing area. Following display, the complete system is returned to an initial condition where all display members are in precisely like arrangement.

The control of motion of the display member, according to the invention, is provided through a series of fluid jets positioned in columnar relationship for directing fluid which, in most instances, may be air under relatively low pressure, toward the bistable elements at sufficient force and precision of control selectively to turn it to one or the other of the bistable positions, as required. The control jets are arranged to protrude from a fluid pressure chamber. With a multiplicity of jets directed outwardly from the single chamber, and each in such relative arrangement to the other as to correspond illustratively to a display member position on the panels, a control may be established whereby the fluid jets are normally closed but are selectively opened by a signal-controlled armature adapted to respond to activation of a magnetic circuit. So arranged, the magnetic circuits control the opening of each jet in the column at a speed sufficiently high that adjacent different columns of display members are selectively controlled as the panels are transported along an endless path to move the display members before the jets.

The control is preferably by column so that letters, figures, writings, characters or other pictorial information, when displayed, shall appear as if being built up. The rapidity with which the display can be created is usually as great as the speed at which the message to be displayed can be received and observed. Following the creation of the desired information for viewing by an arrangement of turned discs, the entire panel is moved through a viewing area for observation. The panels preferably move from right to left as the message is developing so that there is an appearance as if the message is being written as displayed.

The invention, as so controlled, finds particular application in the display of stock price quotations where, as a general practice, the letter identifications of stocks appear along the upper edge of the tape or display and the price at which the transaction is completed is generally on the lower portion of the display or tape. The present invention takes care of providing this information so arranged in providing a fluid pressure chamber with fluid jet elements of a number corresponding to the number of display members in each panel column with the jets also being arranged in columnar form and so coordinated and controllable relative to each other that a choice between different openings and closings of jets can provide for displaying either letters or numerals in accordance with the receipt of control signals.

Various ways for controlling the magnetic circuits for triggering the valve operation may be utilized. generally speaking, the control circuitry is of the type by which binary signal information, when received, can be coordinated to the projection of particular characters in the way of letters, figures or the like for such display. As an example of the control of such message production, various forms of matrix devices may be utilized for storing received message information prior to the display and various other forms of circuitry may be utilized to control the distribution of the stored energy.

The signalling information to provide the control is normally coded to represent different selected characters including various letters and figures, or other intelligence. Normally, in order to provide the wide selection of characters, a six-bit binary code is adopted. This will permit the reproduction of 64 completely different characters for display. Energy storage in the matrix is usually under control of suitable shift register circuit components so that the received binary information may be transformed to controlling pulses which can be used to select the control operation and value triggering necessary to coordinate the display with the transmitted instruction. The particular control features for achieving this type of operation are not, per se, a part of this invention but are mentioned at this point in order to relate the operation complete control and display system.

A form of matrix device particularly adapted to the control of display members here set forth has been included in the description and claims of application for Letters Patent for this invention entitled "MATRIX STORAGE SYSTEM" filed concurrently by this inventor with this application and identified as Ser. No. 601,071, now U.S. Pat. No. 3,530,456. Circuitry particularly adapted for providing the control signals for energizing the matrix is likewise disclosed in a concurrently filed application for Letters Patent of this inventor filed as Ser. No. 600,901, now Pat. No. 3,496,386. entitled "SIGNALING CIRCUIT."

SOME OBJECTIVES TO BE ACHIEVED

Among the objects of this invention are those of providing apparatus for making a more positive and more rapidly effective display of intelligence in the form of letter, figure, character or pictorial information. A further object of the invention is that of providing a display panel structure capable of achieving extremely high operating speeds. Still another object is that of providing a display panel structure in which the maintenance is reduced to a minimum and in which the display efficiency is maximum. Other objects will, of course, become apparent and will suggest themselves by reading the following description and claims.

THE DRAWINGS

The accompanying drawings show generally schematically the invention as it is practiced. By these drawings.

DESCRIPTION OF ILLUSTRATED STRUCTURE

Figure 1:
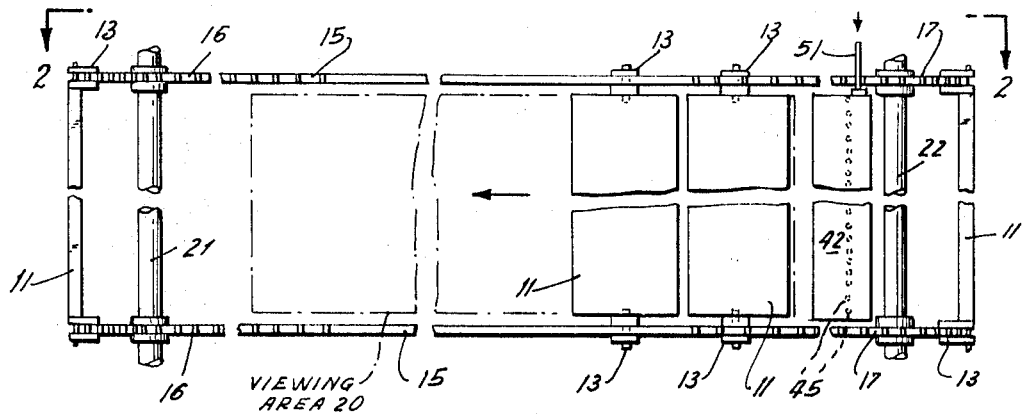
FIG. 1 is a partly broken away view and largely schematic elevational showing to represent a drive mechanism for moving a series of interconnected display panels within a field of view following the representation of messages or intelligence on the panels.
Figure 2:
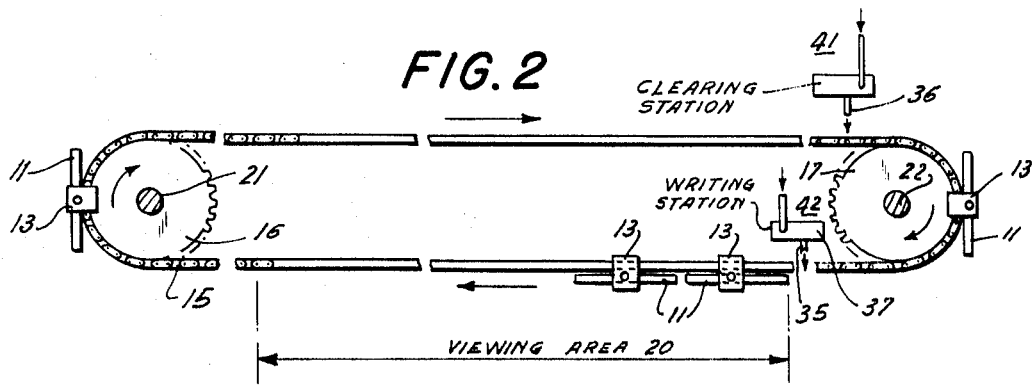
FIG. 2 is also a schematic view and is likewise partly broken away looking at the panel drive structure of FIG. 1 generally from the top and in a way to show the so-called "clearing" and "writing" positions.

Making reference to the drawing for a further understanding of the invention, a series of panels 11 is supported in any desired fashion as by the schematically represented clamps 13 on any desired form of conveyor. The conveyor, as schematically represented by FIGS. 1 and 2, is shown as a pair of endless chains 15 adapted to be wrapped around a pair of sprocket members 16 and 17 arranged, respectively at the left and right ends of a suitable viewing area schematically represented at 20. The sprockets 16, as well as the sprockets 17, are each secured to shaft members 21, 22 of which one may be a drive element and the other a driven element. Each of the shafts is arranged externally to the viewing area as schematically represented by FIGS. 1 and 2 in particular and at least one is powered from any suitable and desired source (not shown). The vertical separation between the sprockets 16, or the sprockets 17, along the shafts 21 or 22 is at such distance as to permit a display panel of the general form shown by FIGS. 7 and 8 to be supported therebetween and thus provide through the chain drive an interconnected series of panel elements. The clamps 13 are secured to the ends of each panel member and are attached (as particularly noted by FIG. 2) also to the conveyor chain to permit travel and suitable support. The conveyor need not necessarily be a chain but shall be some suitable form of drive element adequate to support the panels at their top and bottom so that as driven over suitable sprockets or pulleys 16 and 17, the panel members will advance illustratively in the direction shown by the arrows on FIGS. 1 and 2. Illustratively, it is usually desirable that the panel movement be from right to left across the viewing area so that the created message shall appear in the fashion one could read, namely, left to right.

The panel members, in most instances, are formed as support members having window areas 24 within each of which a suitable 61 member 25 is supported for movement with an approximately 180° of rotation. These display members 11 are usually in the form of discs and, thus, for convenience reference to a "disc" herein 13 be broadly interpreted as a substantially flat, thin, lightweight element of suitable geometric shape, such as square, rectangular or other form. The disc is one convenient shape which particularly adapts itself to a great many letter and figure formations and is thus an example of one form much preferred. Each display disc 25 is supported by a support pin 27, or the equivalent, which extends into the frame of the support panel 11. Each disc also is 41, with a bearing surface (not shown) sufficient to permit rotation illustratively, between the solid line position and the dot-dash line positions shown particularly by FIG. 6.

In some instances, the disc or display member may be formed with a downward appendage 28 at each side arranged for mounting in the bearings 27. In other instances, the disc may have attached and secured to one side a small spindle shown illustratively at 29 in FIG. 5. Where the spindle is used, it extends completely across one side of the disc and slightly beyond the disc periphery to provide for mounting in the bearings 27. The discs are positioned in the frame of the panel so as to form rows and columns as shown particularly by FIGS. 7 and 8.

One side 30 of each disc is preferably coated with a bright covering, such as a bright paint or other material, which, when exposed to direct light or, for instance, when exposed to ultraviolet light, will produce a glow or, at least, be sufficiently bright readily to provide an outline of letters, numbers, figures or other scenes. The other side 31 of each disc is preferably dull or blackened to provide a substantially nonreflecting surface area.

Figures 7, 8, 9:
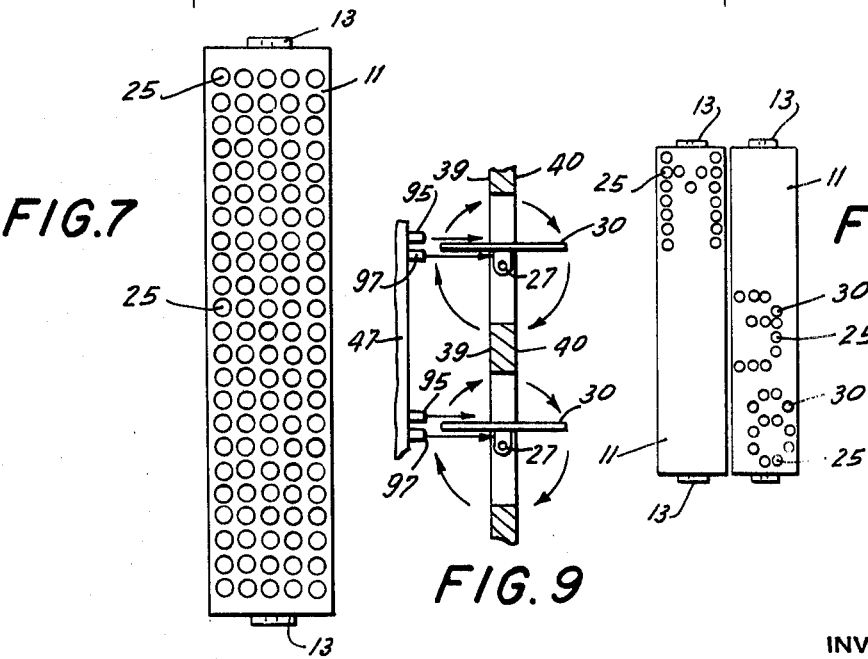
FIG. 7 is a view of a single panel in which the separate display members forming one panel formation of rows and columns are depicted by a multiplicity of circles.
FIG. 8 is a reduced size view to show certain of the display members of two adjacent interconnected panels turned to such position as to represent each of a letter and a character or figure.
FIG. 9 is a schematic showing of a modified arrangement of the clearing station wherein unpulsed jets are provided to control the initial position of the display elements.

Messages in the form of letters, figures or pictorial representations customary the like are provided by turning selected ones of the disc elements 25 so that either the bright surface 30 will appear against a dark background or so that the dark covered areas may appear against a bright field. In the showing of FIG. 8, it may be assumed that the discs in the upper portion of the left-hand panel have been turned so as to form the letter "M." The discs in the adjacent right-hand panel are turned to form the fraction "three-eights." It is usually customary to provide for forming the letters above the numerals, although the system is in no sense predicated thereupon. The discs are turned in the fashion schematically represented by FIG. 6 where fluid jets 35 and 36 are arranged either on the rear side of the belt or conveyor travel path or on the front side to be effective at a time just prior to that when the belt and the panels reach the viewing area 20.

Figure 6:
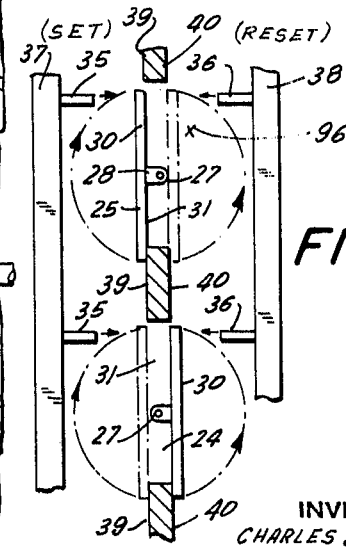
FIG 6 is a schematic partial cross section and elevational view of the columnarly arranged display members and a sectional edge view of the panel structure with two of its several display members shown in the different bistable positions.

In the schematic illustration suggested, the jets 35, at an assumed writing station, are supported to extend outwardly from a sealed pressurized fluid-containing chamber 37 into which air or other fluid is supplied under pressure and permitted to leave by way of a controlled opening and closing of a valve connected to each jet. Operation of the jet valve itself will be explained further in connection with the illustration of FIGS. 3 and 4. Between the clearance station and the viewing area of the panel, additional pressurized fluid-containing chamber means 38 is provided. Here also a number of fluid-ejecting jets 36 extend outwardly toward the panel and its supported disc elements. The jets 35 and 36 are each arranged close to the path of travel by each of the panel members and the supported disc elements 25. As the panels and discs are moved before the jets, a controlled release of air or other fluid in the direction shown by the arrows is sufficient to strike the outer edge of each disc 25 and to move it about its supports 27 as a pivot to change its position from a rest against the inner surface 39 or 40, as the case may be, of the panel proper to a position where it rests against the outer surface 40 or 39 of the same panel, depending, of course, upon which side the jet was active. Illustratively, the jets 36 assumed to be at the clearing station 41 are all activated each time a panel section moves to a point adjacent to the clearing station. With the panels continuously moving on the belt path and moving so that one column of discs after another in each row moves past the clearing station, it can be appreciated that all discs 25 which are not turned previous are turned by the clearing station jets 36 to a position like that represented by the solid outline disc shown as the upper disc of FIG. 6. This brings all disc elements 25 of the panel into such position that when the writing station is reached, jet elements at positions corresponding to the outline of the desired character (or the reverse thereof) are activated to turn selected discs of the group to portray the desired intelligence. The absence of any jet excitation against a particular disc leaves the disc in that position in which it was placed at the clearing station. The disc elements, as can be seen clearly from FIG. 6 are so held in their supports that when mounted in the bearing surface 27 the weight of the disc is offset from the support point. Even though the disc is extremely light in weight nonetheless there is a turning movement measured by the displacement of the plane of the disc from its pivot which is adequate to cause the disc to remain adjacent to the inner or outer panel wall, depending upon which side the initial jet action came from. Thus, in the showing of FIG. 6, the upper jet 35 at the left can be seen to be directing its fluid stream against the upper edge of the upper disc 25. So activated, the disc 25 will change its position about the bearing surface 27 as a center to assume the dot-dash position shown immediately to the right in the upper portion of FIG. 6. Each position is retained by reason of the bistable arrangement already explained. If the disc is already in the position last named the jet activation has no effect since the disc cannot be turned to any further extent. If it be assumed that the dark position of each disc corresponds to that shown by the solid outline of the upper disc in FIG. 6, then movement of the panel past the upper jet 35 will turn all discs 25 so that each assumes a position precisely like the lower disc shown in solid outline in this figure. At this point, the panel section with its discs all turned to a like position by reason of the clearing jets 36 shown to the right of the panel may now be selectively controlled to be turned to form the outlines of letters or figures or the like shown by FIG. 8. Turning selected disc elements by controlled jets 35 may then turn the disc elements to a position such that, for the illustration shown, the second bistable position is adjacent the outer wall 40 of the panel section.

Figure 3:
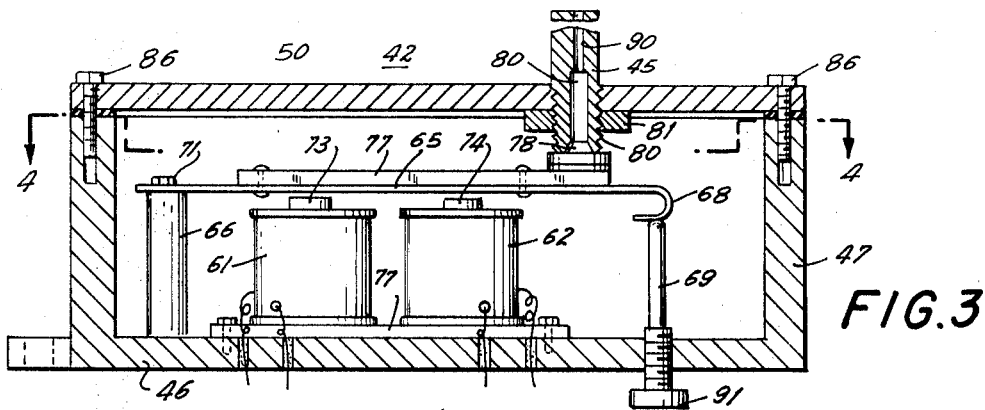
FIG. 3 is a sectional end view of the fluidtight chamber from which the control jets project and within which the magnetic control of the jet valve motion is established.
Figure 4:
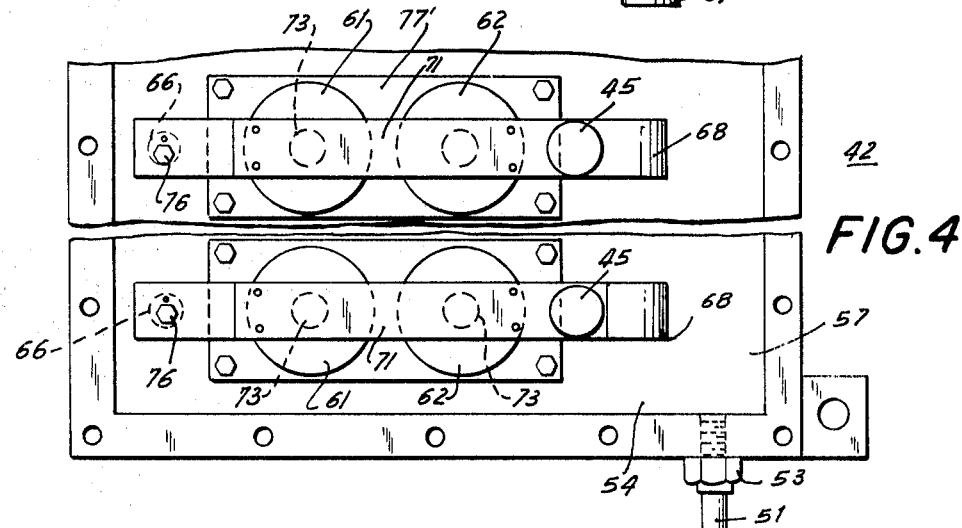
FIG 4 is an elevational view largely broken away but showing a plurality of the magnetic controls of the type to control the separate air jets in columnar array.

Referring now to the showings of FIGS. 3 and 4, the fluid pressure chamber 42 is a closed component usually of metal having bottom member 46, side members 47, end members 48 and a removable top member 50. These may be unitary members or all suitably secured to one another. For purposes of illustration, it may be assumed that the fluid medium used to control movement of the panel discs 25 is air under pressure, although any fluid is usable. As disclosed, illustratively, by FIG. 4, the inlet air may be supplied from any suitable source (not shown) via the inlet tube 51 suitably fastened by the fastener 53 to introduce air within the interior 57 of the storage chamber 54. As can be seen from the cross-sectional elevational view of FIG. 3, the outlet valves 45 connect into the chamber top in any suitable leakproof fashion. Each valve protrudes through the top or cover member 50 to a point adjacent the discs 25 (see FIG. 6) and occupies, relatively speaking, a position analogous to the pressure chamber 37 of FIG. 6.

Considering FIG. 4 for the movement, the figure is intended to show each of the valve structures for bringing about a rotation of selected ones of the discs 25. In the illustration shown, only two valve control positions have been indicated, these, illustratively, being the positions at the uppermost and lowermost levels on the control panel. The valves may all be assumed to be generally in alignment with each other and each may be assumed to be controlled by the magnetization of a pair of control windings 61 and 62 which are controlled by an impressed input signal (not here shown or described).

Reverting for the moment to the showing of FIG. 3, the elevational view may be considered to portray the conditions adjacent to one of the valves of the assembly, it being understood that all valves are mounted adjacent to each other and, in the examples shown, one above the other. The showing of FIG. 3, in its sectional view, portrays the control exerted at the writing station, as contrasted with the showing at the clearing station 41. At the clearing station 41, just prior to the position whereat the conveyor carrying the panels turns to bring the record substantially into a single common state after the message or intelligence has been displayed, all valves can be assumed to be operated simultaneously with a continuous reset fluid flow therefrom, as contrasted with selective pulsing as shown more particularly by FIG. 3. In all forms of control, there is contained within the housing 42 (or 41, as the case may be) a series of armature support elements 64 which are pivoted to a pin or post 66 at one end and extend outwardly from the post across the cores of the windings 61 and 62.

The outer end of each support element 65 is bent into generally U-shape formation at the region 68 where it contacts the adjusting pin 69. The interior portion of the armature support from the curved end inward toward its ridge of support is illustrated by the armature portion which is carried from the support pin or post 66 as in cantilever array and fastened by the fastening pin 71 which is secured to the post in the desired fashion. The windings 61 and 62 have internal cores 73 and 74 which are positioned directly below the magnetic armature member 77. The fixed end of the armature 72 is held by a locating pin 76 thereby to prevent armature turning, with the nut 76 tightening the combination to the support post 66 so as to form the armature into a generally cantileverlike structure. The magnetic element 77, through which the magnetic path is formed, is secured to the upper surface of the armature support element 65. The windings are carried in supports 77' through which the magnetic path is completed.

Adjacent to the end of the armature, a valve structure 78 is appropriately positioned. The valve structure itself is generally frustoconical in shape. It fits into the seat 80 of the valve 45. The valve is tightly threaded into the upper closing wall 50 of the sealed chamber and the airtight fit between the chamber top wall and the valve is maintained by an appropriate gasket 81. The cover or top 50 of the airtight chamber is suitable fastened to the chamber body by means of the fastening pins or bolts 86.

The magnetic path through the assembly is through the magnetic iron armature piece 77, the magnet iron pole pieces 73 and 74 and then through the magnetic iron support plate 77'. Energization of the magnet windings 61 and 62 then draws the magnet iron armature piece 77 which is backed by the nonmagnetic strip 65, down toward the pole pieces. At this time, the valve structure 78 is drawn away from the valve seat 80. Then, air, which is under pressure in the closed chamber 37, can escape from the nozzle opening 90 thereby to be directed out toward the disc nearest the particular nozzle. The valve seat member 78 is generally formed of a plastic so as easily to fit within the valve seat for valve closure periods. With this construction, it is possible to obtain operational speeds of considerably less than 1 millisecond and to provide substantially snap action of the armature 65 to open the valve. Valve closure is substantially equally as fast as the U-shaped end 68 of the armature 65, after being pressed close to the pin 69, provides a rapidly acting compression spring member which will rapidly close the valve as soon as the magnetizing effect to draw the armature 65 to the cores is removed. This is substantially an inertialess spring so that there is no damping effect but is either a rapid opening or closing of the valve member.

The top view of FIG. 4 shows generally the described valve control mechanisms operated under the influence of the magnetic elements 61 and 62. In this respect, it will be appreciated that, if desired, one airtight control chamber may be provided for say, the upper 10 rows of jets in each panel and the lower 13 rows of disc elements may be allocated to a different airtight chamber. Also, it is equally clear that a single airtight chamber may be used to support all valve elements. The control of the particular valve in the array consisting of the assumed 23 positions from top to bottom is established by the incoming signal energy pulses which are usually of binary nature. In the case of the clearing or erasing station at position 41, all valves in the array are intended to operate simultaneously so that all discs are turned to a start or neutral position. The energization of the magnetic windings of the control unit at the clearance position causes all disc elements in each column on the panel to move to the assumed start position. The rate of valve actuation is set to correspond to the rate at which each column of discs moves past the control path. The valves will open and air from within the chamber will pass out through the jets at such times to turn all discs of the column simultaneously.

Following the advance of the panel from the clearing position to the writing station, the current supplied to the numerous magnet windings 61, 62 of each valve is separately controlled so that for positions where a half-turn rotation of the disc from one bistable state to another is not required. No energization of the magnetic windings 61 or 62 associated with that particular disc will result. At those positions where it is necessary to rotate the disc to provide the proper display, the windings of corresponding positions will all be simultaneously energized. The arrangement is set up to provide the sealed chamber under air pressure which, for instance, may be some 10 to 15 pounds above atmospheric. Jets, all in vertical alignment, corresponding in number to the number of discs in each column of the panel, are connected to the fluid chamber. Where, in the assumed example, letters only are to be represented, the valves 90 in the vertical array corresponding to the first 10 positions only are normally activated. Where the operation is returned to a state of equalization where all discs are similarly oriented, it is usually desirable to release all valves simultaneously. Thus, at the clearing station, if all jets are simultaneously to eject fluid under pressure, all discs or display members will be turned to a similar position. If a disc has already been turned to the desired position, the energization of the jet will be ineffective to rotate it. If a disc has not been turned, it will then be turned to bring all discs to a like relationship to each other and to the message. This leaves a disc array in which the rotation of other discs to selected positions will permit the pattern form to stand out as against the background. The standout pattern is produced by a selective control of the particular jets to be activated, it being borne in mind that at this point all discs may be assumed to be similarly oriented.

As an example of the control, in the formation of the letter "M," as shown by the left panel 11 in FIG. 8, it can be assumed that prior to the panel reaching the "write" station, all discs are turned to a like state. Since it is usually better to have a bright character outline on a dark field, this like state will mean that each disc is turned so that the dark face is toward the viewing direction. Then, to form the letter "M" all of the discs in the first column in positions 1 through 7 will be turned to provide the bright or high light side facing forward. As the panel moves by its drive mechanism to place the discs of its second column in front of the writing valve structure 42, it is clear that at column 2, only the valve in the second position from the top will open. A similar condition will occur when the fourth column arrives at the writing station. As the third column reaches the writing station, the third disc from the top is turned. The change at the fifth column for the assumed example will be to provide a conditions of the conditions which occurred at the first column. Other letters will be provided by other valve openings as can be determined, for instance, by the showing of the "three-eighths."

Various ways and means for providing the signal control to energize the magnetic windings may be provided and arranged to become effective from the use of any suitable letter and figure code which, per se, forms no part of the present invention.

The valve mechanism described should be regarded as a fast and positive-acting component for which there are many uses. Such valves in some other uses need not have multiple jets as here suggested but may be provided with but a single jet to provide any desired form of control. The fluid medium to be ejected from the jet is usually air or other gas but, in some instances, as in mixing operations, for example, it may be a fluid.

This disclosure does not include details of any speed control for the panel drive. Likewise, the disclosure does not establish any specific relationship between the panel advance speed and the rate at which the jets are operated to orient the display members or discs to one or the other of their bistable positions. In preferred operations, the rate at which the panels are moved through the viewing area is coordinated with the rate at which it is desired to reproduce the characters on the panels for intelligence display. Speed controls coordinated to received signal energy used to establish the particular display disc components instantaneously controlled are normally provided. As was mentioned herein, the control signals for establishing the message reproduction are usually binary coded information. A 6-bit code is now customarily adopted by the New York Stock Exchange and transmitted. Through appropriately chosen controls, the panel speed may be adjusted in accordance with the rate at which such code messages are received. Similarly, if the panel speed is adjusted to correspond to that rate at which the messages are being received, the rate at which the columnarly arranged valves connected into the fluidtight pressure chamber can be operated, may be similarly controlled. The intelligence displays may be appropriately and readily coordinated with any desired rate of transmission.

Figure 5:
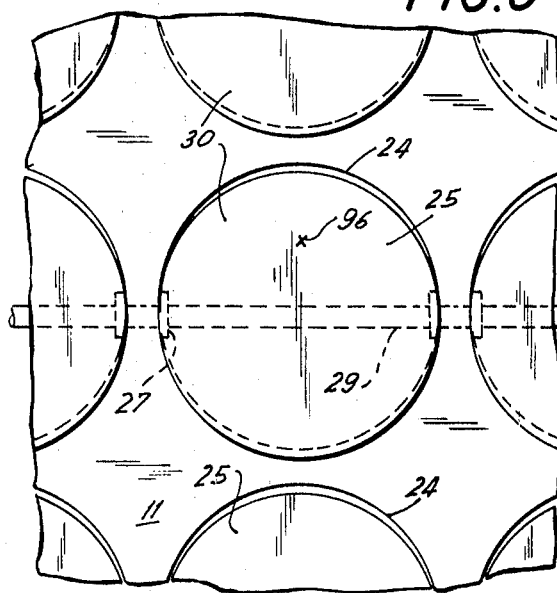
FIG. 5 is a generally enlarged section to show a portion of the bistable discs and to illustrate the general mounting arrangement with respect to the panel structure per se.

The foregoing description dealt with jet elements which could be pulsed at the clearing station like those at the writing station. Generally speaking, this is often to be preferred although it is generally a more costly operation than to use a continuous jet. Since there is no need for selectivity with respect to the clearance station, it is possible to use a continuous air reset jet arrangement for returning all display elements or discs to a uniform state. The air reset jet structure, as described by FIG. 9, comprises in the preferred embodiment for each display member or disc 25 a pair of jet members. One of these jet members 95 is mounted relative to each display element of disc so that it initially strikes the component at a point about one-half the disc diameter out from its center on the support axis. For illustration, such a point is shown on FIGS. 5 and 6 illustratively, as the point 96. When the display elements or discs are exposed to the action of the continuous jets of air or the like at the clearance station, the panels 11 are moving relative to the clearance station 41 as shown by the arrow in FIG. 2. Consequently, as the very light display element or disc is subjected to the action of the first jet 95 (see FIG. 9), the jet tends to turn the disc element, such as the disc 30, about its support point on a shaft such as the shaft 29 in the bearing 27 until, because of the Bernoulli effect, the disc tends to hold itself substantially in the plane of the jet. This is to say that the jet tends to "plane." With only a single jet, it could happen that, as the disc passes beyond the field of jet activity, it could fall to the wrong side unless further action is taken. Consequently, to insure the turning of the disc from the clearance station where it bears a position such as that shown by the solid outline disc 30 rested against the supports 39 (as in FIG. 6), a second jet 97 (see FIG. 9) is arranged along the path of travel and offset by about a half disc diameter from the position of the jet 95 in the direction of movement. This makes it possible for the air issuing from the second jet to pick up the leading edge of the disc and cause it to complete its rotation regardless of the speed of movement. The second jet 97 is so positioned vertically with respect to each disc that it will strike the partially turned disc at a position between the plane of the underside of the disc and the support or pivot point. This is sufficient to cause the disc to complete its half rotation and, for instance, to turn from a position shown by the solid outline at the top portion of FIG. 6 to the position of the dot-dash line opposite.

The jets 95 and 97 are positioned at the clearing station location. There are as many pairs of jets 95 and 97 arranged vertically as there are separate vertically arranged disc elements in the display panel, as suggested by the outlets 45 of FIG. 1. The clearing jets serve to turn all display elements or discs to similar positions. The jets 36 of the writing station which the panels next pass in their path of movement supply the message which is to be viewed.

As an alternative to the two jets 95 and 97 at the clearing station, the desired turning effect can be achieved by a single jet for each disc where the jet has a generally rectangularly shaped outlet nozzle and is set at an angle such that the moving disc is first contacted at a point well above its axis of rotation and then, as the disc is turned and the panel is moved relative to the jet, the portion of the jet outlet in the region of the support becomes more active and the complete turning is achieved. It should be understood that actually the jets 36 are writing jets and, therefore, positioned along the path of travel of the panel sections in the general relative locations shown by FIG. 2.

Various modifications which fall fairly within the spirit and scope of this disclosure are contemplated where they fall fairly within the aspects of the claims herein appended.

Having now described the invention what I claim is:

1. An electromagnetic valve comprising a fluidtight chamber adapted to have fluid under pressure above atmospheric supplied thereto, jet nozzle structure means connected into said chamber, a passage formed in said nozzle structure means allowing passage to and from said chamber, an electromagnet, a resilient armature member disposed within the magnetic field of said electromagnet, a surface of said armature member, a valve member projection from said surface toward said jet structure nozzle means, a stop member yieldingly urging said valve member away from said electromagnet and toward said jet structure nozzle means to close said passage, said armature member responsive to energization of said electromagnet to move toward said electromagnet whereby said valve member is moved from said jet structure nozzle means to open said passage, and said stop member constructed and arranged to increase the force with which it urges said valve member toward said passage as the distance between said armature member and said electromagnet is decreased, and an end of said armature member turned upon itself to allow said surface to contact said stop member whereby movement of said armature toward said electromagnet causes the force with which said surface contacts said stop to be increased.

2. An electromagnetic valve in accordance with claim 1 in which a second electromagnet is provided and said armature is fixedly supported at one end with said armature and said electromagnets arranged to provide substantially equal spacing between each of said electromagnets and said armature.

3. An electromagnetic valve in accordance with claim 1 in which the end of said armature which is turned upon itself provides a U-shaped portion.

UNITED STATES PATENT OFFICE
CERTIFICATE OF CORRECTION

Patent No. 3,589,672　　　　　　　　　　Dated June 29, 1971

Inventor(s) Charles J. Holloman

It is certified that error appears in the above-identified patent and that said Letters Patent are hereby corrected as shown below:

On the cover sheet [72] "Charles J. Hoolloman" should read -- Charles J. Holloman --. Column 1, line 15, "new" should read -- news --. Column 2, line 70, "generally" should read -- Generally --. Column 3, line 13, "value" should read -- valve --. Column 4, line 45, "61" should read -- display --; line 48, "13" should read -- should --; line 55, "41," should read -- provided --. Column 5, line 4, "customary" should read -- or --; line 61, cancel "move-"; line 62, "ment" should read -- moment --. Column 6, line 32, "movement" should read -- moment --; line 57, "64" should read -- 65 --. Column 8, line 33, "conditions", first occurrence, should read -- repetition --. Column 10, line 16, "herein" should read -- hereto --. Claim 1, line 8, "projection" should read -- projecting --.

Signed and sealed this 18th day of January 1972.

(SEAL)
Attest:

EDWARD M. FLETCHER, JR.　　　　　　ROBERT GOTTSCHALK
Attesting Officer　　　　　　　　　　Acting Commissioner of Patents